United States Patent [19]
Sasaki

[11] Patent Number: 6,110,581
[45] Date of Patent: Aug. 29, 2000

[54] MAGNETIC RECORDING MEDIUM

[75] Inventor: Taro Sasaki, Miyagi, Japan

[73] Assignee: Sony Corporation, Tokyo, Japan

[21] Appl. No.: 09/086,989

[22] Filed: May 29, 1998

[30] Foreign Application Priority Data

May 30, 1997 [JP] Japan .................................. P9-142512

[51] Int. Cl.$^7$ .................................................. G11B 5/706
[52] U.S. Cl. .................................... 428/328; 428/694 BA; 428/900
[58] Field of Search ............................ 428/328, 694 BA, 428/900; 252/62.55

[56] References Cited

U.S. PATENT DOCUMENTS 5,527,603  6/1996  Isobe et al. .............................. 428/323

*Primary Examiner*—Stevan A. Resan
*Attorney, Agent, or Firm*—Hill & Simpson

[57] ABSTRACT

The present invention provides a magnetic recording medium having an excellent dispersion stability of a magnetic paint and excellent magnetic characteristic.

The magnetic recording medium includes a non-magnetic support body on which a magnetic layer is formed which contains a ferromagnetic metal powder having a saturation magnetization of 148 Am$^2$/kg or above and a binder. The ferromagnetic metal powder mainly consists of a transition metal to which Al, Si, and Sm are added. The Al content is in the range defined by: 24 atomic % $\leq$ A/(Al+Si+Sm) $\leq$ 45 atomic %. The binder contains 20 weight % of vinyl chloride resin having a polar group with respect to the total of binder agents.

4 Claims, No Drawings

MAGNETIC RECORDING MEDIUM

BACKGROUND OF THE INVENTION

1. Field of the Invention

The present invention relates to a magnetic recording medium used in an audio tape, video tape, data cartridge, floppy disc, or the like.

2. Description of the Prior Art

As a recording medium used in an audio apparatus, a video apparatus, a computer apparatus, and the like, there is widely spread a so-called paint-type magnetic recording medium for its excellence for general purpose, which recording medium has a magnetic layer prepared by painting on a non-magnetic support body a magnetic paint prepared from a magnetic powder dispersed together with a binder and various additives in a solvent and kneaded, wherein the paint is dried after applied onto the non-magnetic support body.

Various types of magnetic recording and reproduction apparatus tend to reduce the size and weight and improve the image quality as well as to increase the recording/reproduction time, which in turn requires a higher recording density in the aforementioned paint-type magnetic recording medium.

In order to improve characteristics in a high density recording region of the paint-type magnetic recording medium, firstly, selection of a magnetic powder is highly important. That is, the magnetic powder should have a high coercive force and a large saturation magnetic flux density, and should be in fine particles.

To cope with this, instead of an iron oxide magnetic powder which has been used conventionally, a ferromagnetic metal powder containing iron as a main content has come to be used as the magnetic powder contained in the aforementioned magnetic layer.

This ferromagnetic metal powder is prepared from a needle-shaped iron oxyhydroxide or iron oxide which is heated to be deoxidized in a deoxidizing gas and then a thin oxide film is formed on particle surfaces for assuring an oxide stability. The ferromagnetic metal powder thus prepared has a high coercive force, enabling to obtain a high magnetization quantity in comparison to the iron oxide magnetic powder.

Moreover, as another technique to improve characteristics in a high density recording region, there can be exemplified a technique to increase dispesibility of the magnetic paint. As the magnetic paint has a higher dispersibility, firstly, the magnetic characteristic is improved. Moreover, the rectangular ratio which is an index of particle orientation is improved as well as the residual magnetic flux density is improved. Furthermore, as the dispersability of the magnetic paint increases, the magnetic layer surface after painted has an improved flatness and smoothness, reducing a so-called spacing loss generated between the recording medium and a VTR head, which in turn improves the electromagnetic conversion characteristic.

However, in general, a ferromagnetic metal powder having a large magnetization quantity of particles tends to lower its dispersion stability when used as a paint. That is, when there is a large magnetization quantity, there arises a greater magnetic agglutination between particles and when the paint is left still or in a state near it, the particles may be precipitated, isolating the solvent. As a result, when the paint is applied for coating, it is impossible to obtain a smooth and unanimous coating, which in turn deteriorates the electromagnetic characteristic.

SUMMARY OF THE INVENTION

It is therefore and object of the present invention o provide a magnetic recording medium having an excellent dispersion stability of a magnetic paint and an excellent magnetic characteristic even when using the aforementioned ferromagnetic metal powder having a large magnetization quantity.

The inventors of the present invention, in order to achieve the aforementioned object, studied factors affecting the dispersion stability of a paint besides the magnetic agglutination.

On of the factors is congeniality of the chemical characteristic of the particle surface with the binder. For example, when the particle has a basic surface, it is preferable that the binder have an acid polar group rather than a basic group, so as to promote adsorption, increasing the dispersion stability. On the contrary, if the particle has an acid surface, it is often more advantageous that the binder preferably has a basic polar group.

Whether the ferromagnetic metal powder has an acid or basic group on the particle surface greatly depends on the element and compound existing on the particle surface. In general, when an aluminium oxide or a calcium oxide is present on the particle surface, the particle is basic; and when a silicone oxide is present, the particle surface is acid.

Moreover, the magnetic paint dispersion stability depends on the skeleton of the resin used as the binder. For example, the adsorption form to a particle is different between a vinyl chloride copolymer and a polyester polyurethane, and in general, the former has a greater three-dimensional hindrance effect of the adsorption layer and tends to exhibit a preferable dispersion stability.

The inventors have found that by adding Al, Si, and Sm as configuration maintaining agents to a ferromagnetic metal powder having a saturation magnetization of 148 $Am^2$/kg or above and mainly consisting of a transition metal and by adjusting the quantity of the Al to be added, it is possible to obtain a surface feature of the ferromagnetic metal powder which is appropriate for the vinyl chloride resin used as the binder.

That is, the present invention provides a magnetic recording medium including a non-magnetic support on which a magnetic layer is formed which contains a ferromagnetic metal powder and a binder as main contents, wherein the ferromagnetic metal powder has a saturation magnetization of 148 Am2/kg or above and contains a transition metal as a main content to which Al Si, and Sm is added with the Al content in the range of: 24 atomic %$\leq$Al/(Al+Si+Sm)$\leq$45 atomic %; and the binder contains 20 weight % or above of vinyl chloride resin having a polar group with respect to a total of binder agents.

Thus, the magnetic recording medium according tot he present invention has a magnetic layer formed from a magnetic paint prepared by using ferromagnetic metal powder mainly consisting of a transition metal containing Al in the range of: 24 atomic %$\leq$Al/(Al+Si+Sm)$\leq$45 atomic %, so that the ferromagnetic metal powder has a surface feature appropriate for a binder containing a vinyl chloride resin and that the ferromagnetic metal powder has a preferable dispersion stability in the magnetic paint, enabling to obtain a magnetic recording medium having an excellent magnetic characteristic.

If the Al content, i.e., Al/(Al+Si+Sm) is below 24 atomic %, agglutination of the ferromagnetic metal powder is caused, deteriorating the dispersion stability of the magnetic paint, which is not preferable. Moreover, if the Al content, i.e., Al/(Al+Si+Sm) exceeds 45 atomic %, the ferromagnetic metal powder lowers its rectangular ratio and coercive force, which is not preferable.

It should be noted that it is preferable that the ferromagnetic metal powder contain iron as the transition metal of the main content, and it is preferable to use a iron-cobalt metal powder.

Moreover, a total quantity of Al, Si, and Sm added is preferably in the range of: 8 atomic %≦(Al+Si+Sm)≦20 atomic %. If the total quantity of Al, Si, and Sm, i.e., (Al+Si+Sm) is below 8 atomic %, the ferromagnetic metal powder loses its needle feature, lowering the rectangular ratio and coercive force, disabling to obtain a sufficient effect. Moreover, if the total quantity of al, Si, and Sm, i.e., (Al+Si+Sm) exceeds 20 atomic %, the ratio of non-magnetic powder is increased, lowering the magnetization, which is not preferable.

DETAILED DESCRIPTION OF PREFERRED EMBODIMENTS

Hereinafter, description will be directed to a magnetic recording medium according to an embodiment of the present invention.

The magnetic recording medium according to the present invention is a magnetic recording medium including a magnetic layer formed on a non-magnetic support body, wherein the magnetic layer contains a ferromagnetic metal powder having a saturation magnetization of 148 $Am^2/kg$ or above and a binder as main contents. This ferromagnetic metal powder contains a transition metal as a main content which is added by Al, Si, and Sm, wherein the Al content with respect to the total of Al, Si, and Sm is in the range of: 24 atomic %≦Al/(Al+Si+Sm)≦45 atomic %; and the binder contains 20 weight % or above of vinyl chloride resin containing a polar group with respect to the total of the binder agents.

The ferromagnetic metal powder containing a transition metal as a main content is preferably contains Fe as the main content, i.e., an Fe alloy containing Co, Ni, Cr, Mn, or the like. Especially, in the case of Fe—Co alloy, it is possible to obtain a high saturation magnetization and the Co content to be added is preferably in the range of 1 to 50 atomic % with respect to Fe.

Moreover, the ferromagnetic metal powder according to the present invention contains as configuration maintaining agents Al, Si, and Sm added.

In general, as the starting raw material of the ferromagnetic metal powder, iron oxyhydroxide is preferably used, which is dehydrated into an iron oxide $Fe_2O_3$ which is further deoxidized into an Fe metal powder. Each of the reactions involved here is carried out as a thermal treatment under a high temperature, which tends to reduce the needle feature and the magnetic characteristic of the iron oxyhydroxide. In order to prevent this, it is necessary to adsorb a configuration maintaining agent on the particle surface of the ferromagnetic metal powder. According to the present invention, in order suppress the deterioration of the needle feature and the magnetic characteristic of the ferromagnetic metal powder caused during the production procedure of the ferromagnetic metal powder, Al, Si, and Sm are added as the configuration maintaining agents.

Furthermore, the Al, Si, and Sm are added so as to have the Al content in the range of 24 atomic %≦A;/(Al+Si+Sm) ≦45 atomic %. As a result, it is possible to suppress the deterioration of the needle feature and the magnetic characteristic of the ferromagnetic metal powder and to obtain a surface feature appropriate for the vinyl chloride resin.

If the Al content, i.e., Al/(Al+Si+Sm) is below 24 atomic %, the ferromagnetic metal powder is agglutinated, deteriorating the dispersion stability of the magnetic paint, which is not preferable. Moreover, if the Al content, i.e., Al/(Al+Si+Sm) is above 45 atomic %, the ferromagnetic metal powder has a reduced rectangular ratio and a lowered coercive force, which is not preferable.

Here, the total quantity of the Al, Si, and Sm is preferable in the range of 8 atomic %≦(Al+Si+Sm)≦20 atomic %. If the total quantity of Al, Si, and Sm added, i.e., (Al+Si+Sm) is below 8 atomic %, the ferromagnetic metal powder loses its needle feature and is lowered in the rectangular ratio and in the coercive force, disabling to obtain a sufficient effect. Moreover, if the total quantity of Al, Si, and Sm, i.e., (Al+Si+Sm) exceeds 20 atomic %, the ratio of non-magnetic powder is increased, lowering the magnetization amount, which is not preferable.

Now, as the iron oxyhydroxide as the starting raw material of this ferromagnetic metal powder, it is preferable to use α-FeOOH, β-FeOOH, and γ-FeOOH, and especially preferable to use α-FeOOH and γ-FeOOH.

The configuration of these iron oxyhydroxide, as has been described above, is directly reflected in the configuration oft he ferromagnetic metal powder obtained. Consequently, the iron oxyhydroxide used as the starting raw material, considering the fine particle size of the ferromagnetic metal powder and increase of its coercive force, preferably has a longer axis length in the range of 0.05 to 0.20 μm and the axis ratio of 3 to 15, and has a configuration of a needle shape, pillar shape, spindle shape, or bar shape. It should be noted that the iron oxyhydroxide, as has been described above, may contain Co, Ni, Cr, Mn as well as Mg, Ca, Ba, Sr, Zn, Ti, Mo, Ag, Cu, Na, K, Li, Al, Zr, and other metal compound.

Moreover, adsorption of the configuration maintaining agents such as Al, Si, Sm, and the like is carried out by using a salt which can solve these elements such as a chloride, sulfate, nitrate, and the like. That is, an aqueous solution of Al, Si, and other compounds is added so as to be uniformly solved in a suspension liquid containing iron oxyhydroxide suspended in water, and adjusting the pH of this suspension liquid toward alkaline side. Thus, the configuration maintaining agents are adsorbed. The adsorption processing requires such a pH adjustment and normally sodium hydroxide, sodium carbonate, and the like are used. The iron oxyhydroxide after the adsorption is washed, filtrated, dried, and crushed into a fine powder. After this, the fine powder is subjected to a thermal treatment in a non-deoxidizing atmosphere at a temperature of 500 to 750° C. As a result, the iron oxyhydroxide becomes an iron oxide $Fe_2O_3$ and the adsorbed layer is fixed as an oxide layer.

The iron oxide which has been subjected to the aforementioned pre-processing is subjected to a deoxidizing processing. The deoxidizing processing is carried out by heating the iron oxide having the oxide layer of the configuration maintaining agents Al, Si and Sm in a deoxidizing atmosphere at a temperature of 400 to 600° C. The deoxidizing atmosphere is an ordinary gas containing hydrogen as a main content.

Next, the metal magnetic powder which has been subjected to this deoxidizing process is further subjected to an oxygen removing process, so as to form an oxide film. This oxygen removing process is carried out by bringing the metal fine powder into contact with a gas having an appropriate low oxygen concentration. The gas contact method may be either in a solid phase or in a liquid phase. Furthermore, a gas containing moisture is brought into contact so as to add moisture. Thus, according to the present invention, it is possible to obtain a metal magnetic powder having an excellent particle configuration, an excellent magnetic characteristic and an excellent oxidization stability.

Next, the binder used in the present invention is characterized in that the binder contains 20 weight % or more of vinyl chloride resin containing a polar group.

As this polar group, in order to increase dispersability of the magnetic powder, polar functional groups such as —$SO_3M$, $OSO_3N$, —COON, P=$O(OM)_2$, and the like are introduced. Here in the formulae, M represents a hydrogen atom, or an alkaline metal such as lithium, potassium, sodium, and the like. Furthermore, as the aforementioned polar group, it is also possible to introduce a side chain type having an end group of —$NR^1R^2$ and —$NR^1R^2R^3X^-$, and a main chain type of >$NR^1R^{2+}X^-$ as well. Here in the formulae, $R^1$, $R^2$, and $R^3$ represent a hydrogen atom or a hydrocarbon radical; $X^-$ represents a halogen element ion such as flourine, chlorine, bromine, iodine and the like, or an inorganic or organic ion. Moreover, as the polar group, there can also be exemplified a polar functional groups such as —OH, —SH, —CN, epoxy group, and the like. The quantity of these polar groups is in the range of $10^{-1}$ to $10^{-8}$ mol/g and preferably in the range of $10^{-2}$ to $10^{-6}$ mol/g.

It should be noted that the binder used in the present invention needs to contain 20 weight % or above of vinyl chloride resin. As a resin other than vinyl chloride resin, it is possible to use known thermoplastic resin, heat-setting resin, reactive resin which have been conventionally used in the magnetic recording medium, and the average molecular weight is preferably in the range of 15000 to 200000. These binders are used for the purpose of the running durability, flexibility, and tenacity of the magnetic recording medium as well as preferable bonding with the non-magnetic support.

As the thermoplastic resin, there can be exemplified vinyl acetate, acrylic acid ester—acrylonitrile copolymer, acrylic ester—acrylonitrile copolymer, acrylic ester—vinylidene chloride copolymer, methacrylic acid ester—vinylidene chloride copolymer, methacrylic acid ester—ethylene copolymer, polyvinyl fluoride, vinylidene chloride—acrylonitrile copolymer, acrylonitrile—butadiene copolymer, polyamide resin, polyvinyl butyral, cellulose derivative (cellulose acetate butyrate, cellulose diacetate, cellulose triacetate, cellulose propionate, nitrocellulose), styrene butadiene copolymer, polyurethane resin, polyester resin, amino resin, synthetic rubber, and the like.

These resins may be contained in the form of vinyl chloride—vinyl acetate copolymer vinyl chloride—vinylidene chloride copolymer, vinyl chloride—acrylonitrile copolymer acrylic acid ester—vinyl chloride—vinylidene copolymer vinyl chloride—acrylonitrile copolymer, and methacrylic acid ester—vinyl chloride copolymer.

Moreover, as the heat-setting resin or the reactive resin, there can be exemplified phenol resin, epoxy resin, polyurethane setting resin, urea resin, melamine resin, alkyd resin, silicone resin, polyamine resin, ureaformaldehyde resin, and the like.

Moreover, the binder may contain each of these resins as a sole content or may contain two or more of them in combination. Furthermore, these binders other than the vinyl chloride resin may also contain the aforementioned polar group for the purpose of increasing dispersability of the magnetic powder.

The content of these binders with respect to 100 weight parts of the non-magnetic powder is in the range of 1 to 100 weight parts, and preferably in the range of 10 to 50 weight parts. If the content of the binders exceeds this range, repeated slide movement of drive easily causes plastic flow of the coated film, lowering the running durability. On the other hand, if the binder content is too small, there arises a problem such as insufficient dispersion of the non-magnetic powder and lowering in the mechanical strength of the coated film.

For these binders, for the purpose of increasing the durability, it is preferable to add a setting agent. As the setting agent, it is possible to use multifunctional. isocyanate, especially preferable is tolylenediisocyanate (TDI). The setting agent added is preferably in the range of 5 to 30 weight % with respect to the total of the binders.

Furthermore, As the non-magnetic support body which can be used in the present invention, there can be exemplified polyester such as polyethylene terephthalate; polyolefin such as polyethylene and polypropylene; cellulose derivative such as cellulose triacetate, cellulose diacetate, and cellulose butylate; vinyl resin such as polyvinyl chloride and polyvinylidene chloride; plastic such as polycarbonate, polyimide, and polyamideimide; light metal such as aluminium alloy and titanium alloy; ceramic and the like.

In a case when the non-magnetic support body is made from an aluminium alloy substrate or glass substrate having rigidity, the substrate surface may be subjected to an alumite processing to form an oxide film or Ni—P film, so as to make the surface hard.

The magnetic recording medium according to the present invention is realized by preparing a magnetic paint containing the aforementioned ferromagnetic metal powder mixed and dispersed together with the aforementioned binders and a solvent, and applying the magnetic paint on a non-magnetic substrate so as to form a magnetic layer.

The magnetic paint is prepared by the steps of kneading, mixing, and dispersion. For the dispersion and the kneading steps, it is possible to use a roll mill, ball mill, sand mill, Agitor, kneader, extruder, homogenizer, ultrasonic dispersion apparatus and the like.

Moreover, the magnetic paint is applied onto the non-magnetic support body by way of gravure coater or dye coater. The magnetic layer preferably has a thickness of 0.2 to 4.5 $\mu$m after dried.

It should be noted that the other components constituting the magnetic recording medium may any of those used normally for the paint-type magnetic recording medium.

For example, the magnetic layer may be added by a lubricant for increasing the running characteristic. As the lubricant, it is possible to use an ester, mixed ester, or fatty acid diester, fatty acid triester with one of monobasic fatty acid having 10 to 24 carbons and monoatomic to hexatomic alcohol having 2 to 12 carbons.

As a specific example of lubricant which can be used, there can be exemplified lauric acid, myristic acid, palmitic acid, stearic acid, behenic acid, oleic acid, linoleic acid, linolenic acid, elaidic acid, stearic acid butyl, stearic acid pentyl, stearic acid heptyl, stearic cid octyl, stearic acid isioctyl, and myristic acid octyl.

Moreover, the magnetic layer may be further added, if necessary, by additives including a dispersant such as lecithin or carbonic acid, an abrasive agent such as alumina, and a charge preventing agent such as carbon black. These additives may be any of the conventional known materials and are not limited to particular materials.

Furthermore, the magnetic recording medium according to the present invention may have a configuration other than the combination of the non-magnetic support body and the magnetic layer.

For example, in order to obtain a more flat and smooth surface, it is possible to apply a second paint prior to applying the magnetic paint to the non-magnetic support body. The second paint may be either magnetic or non-magnetic material.

Moreover, in order to increase the adhesion of the magnetic layer, it is possible to provide an intermediate layer or under coat layer on the surface of the non-magnetic support body. Moreover, it is possible to provide an overcoat layer on the surface of the magnetic layer.

Moreover, in order to improve the running characteristic of the medium it is possible to provide on the opposite side of the non-magnetic support body not having the magnetic layer, a back coat layer containing a non-magnetic powder (such as silica and carbon black) and a binder (may be those mentioned above) formed to have a thickness of 0.4 to 0.8 μm.

EXAMPLES

Hereinafter, explanation will be given on specific examples of the present invention, but the present invention is not to be limited the examples given below.

Table 1 shows characteristics of a ferromagnetic metal powder used in the examples. Table 1 shows magnetic characteristic measured by using a sample vibration type magnetometer (VSM produced by Toshiba Kogyo Co., Ltd.; magnetic field 15 kOe, sweep speed 10 min/10 kOe), and specific surface determined by using a Rapid surface area analyzer produced by Micrometrics Co., Ltd. The average longer axis length was determined by measuring particle diameters through electron microscopy. Moreover, the atomic ratio Al/Fe, Si/Fe, Sm/Fe, and Co/Fe were determined by using a fluorescent X-ray spectrometric apparatus.

TABLE 1

| Ferro-magnetic powder | Al/Fe [Atomic %] | Si/Fe [Atomic %] | Sm/Fe [Atomic %] | Al/(Al + si + Sm) [Atomic %] | Co/Fe [Atomic %] |
|---|---|---|---|---|---|
| A | 7.9 | 1.0 | 8.6 | 45 | 39.9 |
| B | 6.9 | 2.1 | 9.3 | 38 | 39.2 |
| C | 5.8 | 4.0 | 9.0 | 31 | 39.6 |
| D | 4.6 | 5.6 | 9.2 | 24 | 41.2 |
| E | 3.2 | 5.8 | 9.6 | 17 | 42.2 |
| F | 10.2 | 0.0 | 8.9 | 53 | 39.9 |
| G | 3.2 | 5.8 | 9.6 | 17 | 42.2 |
| H | 3.2 | 5.8 | 9.6 | 17 | 42.2 |

| Ferro-magnetic powder | Saturation magnetization [Am$^2$/Kg] | Coercive force [KA/m] | Rect-angular ratio [-] | Specific surface [m$^2$/g] | Average longer axis length [μm] |
|---|---|---|---|---|---|
| A | 151.5 | 163.1 | 0.504 | 42.6 | 0.11 |
| B | 153.8 | 167.5 | 0.505 | 44.3 | 0.12 |
| C | 152.8 | 167.1 | 0.503 | 47.1 | 0.12 |
| D | 149.6 | 166.6 | 0.512 | 51.5 | 0.11 |
| E | 148.2 | 169.1 | 0.518 | 51.3 | 0.11 |
| F | 157.5 | 147.3 | 0.484 | 38.6 | 0.10 |
| G | 141.0 | 169.9 | 0.523 | 53.3 | 0.12 |
| H | 135.3 | 170.7 | 0.521 | 54.2 | 0.12 |

TABLE 2

| | Composition (1) | Composition (2) | Composition (3) | Composition (4) |
|---|---|---|---|---|
| Ferromagnetic metal powder | 100 | 100 | 100 | 100 |
| Vinyl chloride resin | 20 | 10 | 4 | 0 |
| Polyester polyurethane resin | 0 | 10 | 16 | 20 |
| Abrasive: A1203 fine powder | 3 | 3 | 3 | 3 |
| Charge preventing agent: carbon black | 2 | 2 | 2 | 2 |
| Methylethyl ketone | 120 | 120 | 120 | 120 |
| Toluene | 80 | 80 | 80 | 80 |
| Cyclohexanon | 50 | 50 | 50 | 50 |
| Weight % of vinyl chloride resin with respect to the total of binder agents | 100 | 50 | 20 | 0 |

It should be noted that in Table 2, the binder used was a vinyl chloride resin having —SO3Na as a polar group (trade name: MR-110 produced by Nihon Zeon Co., Ltd.) and a polyester polyurethane resin having —SO3K as a polar group (trade name: UR-8200 produced by Toyobo Co., Ltd.)

Example 1

The ferromagnetic fine powder A described in Table 1 was mixed in an ordinary way with the binder, additive, and solvent according to a composition defined by Composition (1) described in Table 2, which was then kneaded by using a two-shaft extruder. The obtained mixture was added by a further solvent and dispersed by using a Disper for preparatory dispersion before dispersed by using a Sand mill, to prepare the magnetic paint of Composition (1).

Immediately before application, 2 weight parts of polyisocyanate were added to the magnetic paint, which was applied to form a thickness of 3 μm by using a Dye coater onto a polyethylene terephthalate film having a thickness of 7 μm. The painted film was subjected magnetic orientation processing by using a solenoid coil, and dried before subjected to a calendar processing and setting processing to form a magnetic layer. Next, a back layer was formed in a thickness of 0.5 μm by applying a back paint having a composition described below, on the opposite surface not having the aforementioned paint film. Then cutting was carried out to obtain a magnetic tape having a width of 8 mm.

<Back Paint Composition>

Carbon black (trade name: Asahi #50) . . . 100 weight parts

Polyester polyurethane (trade name: Nipporan N-2304) . . . 100 weight parts

Methylethyl ketone . . . 500 weight parts

Toluene . . . 500 weight parts

Examples 2 and 3

Magnetic paints were prepared by using the ferromagnetic metal powder A described in Table 1 with the Compositions (2) and (3) defined in Table 3, which were used to obtain magnetic tapes prepared in the same way as in Example 1 by carrying out the coating, orientation processing, and the back layer formation.

Comparative Example 1

The ferromagnetic metal powder B described in Table 1 was used with the Compositions (1) to (3) defined in Table 3, which were used to obtain magnetic tapes prepared in the same way as in Example 1 by carrying out the coating, orientation processing, and the back layer formation.

Examples 4 to 6

Magnetic paints were prepared by using the ferromagnetic metal powder B described in Table 1 with the Compositions (1) to (3) defined in Table 3, which were used to obtain magnetic tapes prepared in the same way as in Example 1 by carrying out the coating, orientation processing, and the back layer formation.

Comparative Example 2

The ferromagnetic metal powder B described in Table 1 was used with the Composition (4) defined in Table 3, which were used to obtain magnetic tapes prepared in the same way as in Example 1 by carrying out the coating, orientation processing, and the back layer formation.

Examples 7 to 9

Magnetic paints were prepared by using the ferromagnetic metal powder C described in Table 1 with the Compositions (1) to (3) defined in Table 3, which were used to obtain magnetic tapes prepared in the same way as in Example 1 by carrying out the coating, orientation processing, and the back layer formation.

Comparative Example 3

The ferromagnetic metal powder C described in Table 1 was used with the Composition (4) defined in Table 3, which were used to obtain magnetic tapes prepared in the same way as in Example 1 by carrying out the coating, orientation processing, and the back layer formation.

Examples 10 to 12

Magnetic paints were prepared by using the ferromagnetic metal powder D described in Table 1 with the Compositions (1) to (3) defined in Table 3, which were used to obtain magnetic tapes prepared in the same way as in Example 1 by carrying out the coating, orientation processing, and the back layer formation.

Comparative Example 4

The ferromagnetic metal powder D described in Table 1 was used with the Composition (4) defined in Table 3, which were used to obtain magnetic tapes prepared in the same way as in Example 1 by carrying out the coating, orientation processing, and the back layer formation.

Comparative Examples 5 to 8

The ferromagnetic metal powder E described in Table 1 was used with the Compositions (1) to (4) defined in Table 3, which were used to obtain magnetic tapes prepared in the same way as in Example 1 by carrying out the coating, orientation processing, and the back layer formation.

Comparative Examples 9 to 12

The ferromagnetic metal powder F described in Table 1 was used with the Compositions (1) to (4) defined in Table 3, which were used to obtain magnetic tapes prepared in the same way as in Example 1 by carrying out the coating, orientation processing, and the back layer formation.

Comparative Examples 13 to 16

The ferromagnetic metal powder G described in Table 1 was used with the Compositions (1) to (4) defined in Table 3, which were used to obtain magnetic tapes prepared in the same way as in Example 1 by carrying out the coating, orientation processing, and the back layer formation.

Comparative Examples 17 to 20

The ferromagnetic metal powder H described in Table 1 was used with the Compositions (1) to (4) defined in Table 3, which were used to obtain magnetic tapes prepared in the same way as in Example 1 by carrying out the coating, orientation processing, and the back layer formation.

Evaluation

The aforementioned magnetic tapes of the respective Examples and Comparative Examples were evaluated in their characteristics as follows.

The magnetic characteristics were evaluated in coercive force, saturation magnetic flux density, and rectangular ration determined by using a sample vibration type magnetometer (VSM produced by Toei Kogyou Co., Ltd; magnetic field applied 10 kOe, sweep speed 3 min/10 kOe). The rectangular ration which increases as the dispersion increases can be used as a dispersability index.

Moreover, the glossiness of the magnetic layer (prior to the calendar processing) of the respective magnetic tapes was evaluated according to Gloss 45° defined by JIS-8741. That is, a Glossmeter (produced by Nihon Densyoku Kogyo Co., Ltd.) was used to determine the glossiness with an incident light at 45° as a relative value converted in relation to the 100% glossiness of a reference plate having a reference surface. The glossiness also can be used as an index of dispersability.

The solvent separation was evaluated by leaving a prepared magnetic paint for 30 minutes at rest, after which visual observation was made determine whether the solvent is separated in the magnetic paint.

These evaluation results are shown in Tables 3, 4, and 5 below.

TABLE 3

| | Fer-mag Powder | Paint com-pos. | *1 [mT] | *2 [%] | *3 [kA/m] | *4 [—] | 45° gloss [%] | Sol-vent sep. |
|---|---|---|---|---|---|---|---|---|
| Ex. 1 | A | (1) | 315 | 80.1 | 175.2 | 0.543 | 172 | None |
| Ex. 2 | A | (2) | 319 | 81.2 | 176.0 | 0.534 | 196 | None |
| Ex. 3 | A | (3) | 317 | 82.9 | 176.2 | 0.519 | 205 | None |
| C.E 1 | A | (4) | 319 | 79.8 | 175.2 | 0.555 | 140 | Pres. |
| Ex. 4 | B | (1) | 311 | 81.8 | 179.4 | 0.505 | 188 | None |
| Ex. 5 | B | (2) | 327 | 82.3 | 179.9 | 0.496 | 195 | None |
| Ex. 6 | B | (3) | 316 | 83.3 | 180.2 | 0.472 | 211 | None |
| C.E 2 | B | (4) | 329 | 80.9 | 179.1 | 0.513 | 178 | Pres. |
| Ex. 7 | C | (1) | 328 | 82.3 | 181.0 | 0.488 | 176 | None |
| Ex. 8 | C | (2) | 332 | 83.1 | 181.6 | 0.479 | 202 | None |
| Ex. 9 | C | (3) | 332 | 84.9 | 181.3 | 0.451 | 214 | None |
| C.E 3 | C | (4) | 331 | 80.8 | 180.7 | 0.514 | 138 | Pres. |

Notes:
*1 Residual magnetic flux density
*2 Rectangular ratio
*3 Coercive force
*4 Reverse magnetic field distribution

TABLE 4

| | Fermag Powder | Paint compos. | *1 [mT] | *2 [%] | *3 [kA/m] | *4 [—] | 45° gloss [%] | Solvent sep. |
|---|---|---|---|---|---|---|---|---|
| Ex. 10 | D | (1) | 330 | 82.7 | 178.3 | 0.466 | 188 | None |
| Ex. 11 | D | (2) | 322 | 80.6 | 177.5 | 0.499 | 172 | None |
| Ex. 12 | D | (3) | 316 | 80.9 | 177.8 | 0.487 | 165 | None |
| C.E 4 | D | (4) | 320 | 80.0 | 176.4 | 0.481 | 131 | Pres. |
| C.E 5 | E | (1) | 316 | 79.3 | 183.1 | 0.531 | 156 | Pres. |
| C.E 6 | E | (2) | 320 | 80.1 | 183.6 | 0.499 | 151 | Pres. |
| C.E 7 | E | (3) | 311 | 79.5 | 182.6 | 0.521 | 144 | Pres. |
| C.E 8 | E | (4) | 322 | 80.5 | 183.5 | 0.503 | 146 | Pres. |
| C.E 9 | F | (1) | 325 | 77.3 | 183.1 | 0.624 | 148 | None |
| C.E 10 | F | (2) | 256 | 78.7 | 152.3 | 0.602 | 155 | None |
| C.E 11 | F | (3) | 318 | 78.8 | 182.6 | 0.611 | 153 | None |
| C.E 12 | F | (4) | 302 | 75.8 | 183.5 | 0.638 | 121 | Pres. |

Notes:
*1 Residual magnetic flux density
*2 Rectangular ratio
*3 Coercive force
*4 Reverse magnetic field distribution

TABLE 5

| | Fermag Powder | Paint compos. | *1 [mT] | *2 [%] | *3 [kA/m] | *4 [—] | 45° gloss [%] | Solvent sep. |
|---|---|---|---|---|---|---|---|---|
| C.E 5 | E | (1) | 316 | 79.3 | 183.1 | 0.531 | 156 | Pres. |
| C.E 6 | E | (2) | 320 | 80.1 | 183.6 | 0.499 | 151 | Pres. |
| C.E 7 | E | (3) | 311 | 79.5 | 182.6 | 0.521 | 144 | Pres. |
| C.E 8 | E | (4) | 322 | 80.5 | 183.5 | 0.503 | 146 | Pres. |
| C.E 13 | G | (1) | 292 | 80.3 | 185.7 | 0.505 | 178 | None |
| C.E 14 | G | (2) | 299 | 81.1 | 186.3 | 0.488 | 179 | None |
| C.E 15 | G | (3) | 304 | 82.2 | 186.4 | 0.471 | 201 | None |
| C.E 16 | G | (4) | 308 | 83.0 | 186.7 | 0.459 | 210 | None |
| C.E 17 | H | (1) | 284 | 79.8 | 186.2 | 0.535 | 176 | None |
| C.E 18 | H | (2) | 283 | 80.6 | 186.5 | 0.492 | 188 | None |
| C.E 19 | H | (3) | 282 | 81.2 | 187.0 | 0.477 | 196 | None |
| C.E 20 | H | (4) | 286 | 81.8 | 187.3 | 0.488 | 200 | None |

Notes
*1 Residual magnetic flux density
*2 Rectangular ratio
*3 Coercive force
*4 Reverse magnetic field distribution As can be understood from Tables 3 and 4, in the magnetic tapes of Examples prepared by using magnetic paints containing a ferromagnetic metal powder of Fe—Co alloy added by Al, Si, and Sm in the range of 24 atomic %≦Al/(Al+Si+Sm)≦45 atomic % and a binder containing 20 weight % or above of a vinyl chloride resin having a polar group, the solvent separation was prevented, enabling to obtain a magnetic paint having an excellent dispersion stability as well as preferable magnetic characteristics.

On the contrary, in the Comparative Examples 1 to 4 prepared by using a binder containing no vinyl chloride resin, the magnetic paint caused the solvent separation, disabling to obtain a preferable dispersion stability in spite of the addition of Al.

Moreover, in the Comparative Examples 5 to 8 in which the Al quantity, i.e., Al/(Al+Si+Sm) is below 24 atomic %, the ferromagnetic metal powder caused agglutination and the solvent separation in the magnetic paint even when using a binder containing vinyl chloride resin. Furthermore, in the Comparative Examples 5 to 12 in which the Al quantity added exceeded 45 atomic %, the ferromagnetic metal powder lowered its coercive force and the rectangular ratio even when using a binder containing vinyl chloride resin.

Consequently, in order to obtain a magnetic tape having an excellent dispersion stability of magnetic paint and an excellent magnetic characteristic, it is necessary to use a ferromagnetic powder containing Al added in the range of 24 atomic %≦Al/(Al+Si+Sm)≦45 atomic %, and a binder containing 20 weight % or above of vinyl chloride resin having a polar group.

Furthermore, as is clear from Table 5, the ferromagnetic metal powder having a saturation magnetization of 148 $Am^2/kg$ or above exhibits a preferable characteristic. In the Comparative Examples 5 to 8 using the ferromagnetic powder E having a saturation magnetization exceeding 148 $Am^2/kg$ or above caused a solvent separation; whereas in the Comparative Examples 13 to 20 using the ferromagnetic metal powders G and H having a small saturation magnetization, a solvent separation was not caused.

As is clear from the aforementioned, according to the present invention, a magnetic layer is formed by using a ferromagnetic metal powder containing Al in the range of 24 atomic %≦Al/(Al+Si+Sm)≦45 atomic %, and a binder containing 20 weight % or above of vinyl chloride resin having a polar group, and accordingly, it is possible to obtain a magnetic recording medium having an excellent dispersion stability of the magnetic paint and an excellent magnetic characteristic. As a result, it is possible to obtain a magnetic recording medium exhibiting a preferable recording/reproduction characteristic even in a high-density recording region.

What is claimed is:

1. A magnetic recording medium including a non-magnetic support on which a magnetic layer is formed which contains a ferromagnetic metal powder and a binder as main contents, wherein
   said ferromagnetic metal powder has a saturation magnetization of from 148 to 157 $Am^2/kg$ and contains a transition metal as a main content to which Al Si, and Sm is added with the Al content in the range of:
   24 atomic %≦Al/(Al+Si+Sm)≦45 atomic %; and
   said binder contains 20 weight % or above of vinyl chloride resin having a polar group with respect to a total of binder agents.

2. A magnetic recording medium as claimed in claim 1, wherein said ferromagnetic metal powder contains Fe as a main content.

3. A magnetic recording medium as claimed in claim 2, wherein said ferromagnetic metal powder is an Fe—Co alloy ferromagnetic powder.

4. A magnetic recording medium as claimed in claim 1, wherein a total quantity of Al, Si, and Sm added in the range of: 8 atomic %≦(Al+Si+Sm)≦20 atomic %.

* * * * *